(12) United States Patent
Kroes

(10) Patent No.: US 12,491,997 B2
(45) Date of Patent: Dec. 9, 2025

(54) SLIDING GATEBOX FOR THE RELEASE OF WET AND DRY MATERIAL

(71) Applicant: Texas Transland LLC, Wichita Falls, TX (US)

(72) Inventor: Calvin Lee Kroes, Loveland, OK (US)

(73) Assignee: Texas Transland LLC, Wichita Falls, TX (US)

( * ) Notice: Subject to any disclaimer, the term of this patent is extended or adjusted under 35 U.S.C. 154(b) by 256 days.

(21) Appl. No.: 18/047,151

(22) Filed: Oct. 17, 2022

(65) Prior Publication Data

US 2024/0124139 A1   Apr. 18, 2024

(51) Int. Cl.
*B64D 1/16* (2006.01)
*E05D 15/06* (2006.01)

(52) U.S. Cl.
CPC ............ *B64D 1/16* (2013.01); *E05D 15/0604* (2013.01); *E05Y 2201/626* (2013.01); *E05Y 2201/638* (2013.01); *E05Y 2201/684* (2013.01); *E05Y 2201/706* (2013.01); *E05Y 2800/102* (2013.01); *E05Y 2900/502* (2013.01)

(58) Field of Classification Search
CPC ............ E05D 15/0604; E05Y 2201/70; E05Y 2201/626; E05Y 2201/638; E05Y 2201/684; E05Y 2800/102; E05Y 2900/502; E05F 17/00; E05F 15/00; E05F 11/02; E05F 11/00; A62C 3/0235; A62C 3/0242; B64D 1/16; B64D 1/18; B64D 1/00; B05B 1/262; A01C 15/00; A01C 7/085; A01C 7/16

USPC ................ 222/14, 17, 52, 64, 188; 239/171; 244/136; 47/473.3
See application file for complete search history.

(56) References Cited

U.S. PATENT DOCUMENTS

| | | | | |
|---|---|---|---|---|
| 2,924,040 | A | * | 2/1960 | White ...................... B64D 1/16 239/654 |
| 2,986,360 | A | | 5/1961 | Rutten |
| 3,204,895 | A | | 9/1965 | Razak |
| 3,838,649 | A | * | 10/1974 | Barnard ................... B61D 7/28 105/280 |
| 4,382,568 | A | * | 5/1983 | Schertz .................... B64D 1/16 244/136 |
| 5,279,481 | A | | 1/1994 | Trotter et al. |
| 5,501,398 | A | | 3/1996 | Davidson |
| 5,829,358 | A | * | 11/1998 | Deaver .................... B61D 7/22 105/282.2 |

(Continued)

FOREIGN PATENT DOCUMENTS

| | | |
|---|---|---|
| FR | 2610894 A1 | 8/1988 |
| FR | 2610894 B1 | 6/1989 |

(Continued)

*Primary Examiner* — Paul R Durand
*Assistant Examiner* — Michael J. Melaragno
(74) *Attorney, Agent, or Firm* — Baker Botts L.L.P.

(57) ABSTRACT

A gatebox for an aircraft comprises a hopper configured to contain a solid material or a liquid material in the gatebox, an opening within the hopper configured to allow a solid material in the hopper to be discharged from the gatebox, and a door mechanism with a door that is configured to operate in a first mode to release the solid material from the opening and a second mode to prevent the liquid material from escaping through the opening, wherein the door mechanism is configured to move the door linearly when operating in the first mode.

20 Claims, 7 Drawing Sheets

(56) References Cited

U.S. PATENT DOCUMENTS

| | | | | |
|---|---|---|---|---|
| 6,533,198 | B1* | 3/2003 | Podevels | A01C 15/16 |
| | | | | 239/685 |
| 8,548,649 | B2 | 10/2013 | Guyette et al. | |
| 8,579,234 | B2* | 11/2013 | Thompson | B66F 5/00 |
| | | | | 239/171 |
| 9,173,337 | B2 | 11/2015 | Guyette et al. | |
| 9,266,612 | B2 | 2/2016 | Thompson | |
| 9,428,272 | B2* | 8/2016 | Markov | B64D 1/18 |
| 9,617,000 | B2* | 4/2017 | Thompson | A01C 7/085 |
| 10,196,145 | B2* | 2/2019 | Thompson | B64C 7/00 |
| 11,046,433 | B2 | 6/2021 | Trotter | |
| 2007/0096537 | A1* | 5/2007 | Hicks | B60P 1/56 |
| | | | | 298/33 |
| 2012/0248248 | A1* | 10/2012 | Thompson | B64D 1/16 |
| | | | | 244/130 |
| 2015/0239558 | A1 | 8/2015 | Alkaher et al. | |
| 2017/0080267 | A1 | 3/2017 | Wagner et al. | |
| 2017/0291706 | A1 | 10/2017 | Alkaher et al. | |
| 2018/0244390 | A1 | 8/2018 | Alkaher et al. | |
| 2021/0107630 | A1* | 4/2021 | Reabe | B64D 1/16 |
| 2021/0198934 | A1 | 7/2021 | Trotter | |
| 2022/0024587 | A1 | 1/2022 | Trotter | |
| 2024/0124139 | A1* | 4/2024 | Kroes | E05D 15/0604 |

FOREIGN PATENT DOCUMENTS

| | | | |
|---|---|---|---|
| GB | 153063 | A | 10/1920 |
| GB | 1084744 | A | 9/1967 |
| WO | 2019003223 | A | 3/2019 |

\* cited by examiner

```
                    ┌──────────────────────────────────────┐
              400   │  FILL A HOPPER OF A GATEBOX WITH A   │── 401
                   │  SOLID MATERIAL FOR SPREADING THE     │
                   │  SOLID MATERIAL FROM AN AIRCRAFT      │
                   └──────────────────┬───────────────────┘
                                      ▼
                   ┌──────────────────────────────────────┐── 402
                   │  MOVE A DOOR FROM A FIRST POSITION   │
                   │  AT LEAST PARTIALLY WITHIN AN OPENING │
                   │  OF THE GATEBOX TO A SECOND POSITION │
                   └──────────────────┬───────────────────┘
                                      ▼
                   ┌──────────────────────────────────────┐── 403
                   │  MOVE THE DOOR LINEARLY FROM THE     │
                   │  SECOND POSITION TO A THIRD POSITION │
                   └──────────────────┬───────────────────┘
                                      ▼
                   ┌──────────────────────────────────────┐── 404
                   │  DISCHARGE THE SOLID MATERIAL THROUGH │
                   │  THE OPENING FOR AERIAL APPLICATION OF│
                   │  THE SOLID MATERIAL                   │
                   └──────────────────┬───────────────────┘
                                      ▼
                   ┌──────────────────────────────────────┐── 405
                   │  MOVE THE DOOR LINEARLY FROM THE     │
                   │  THIRD POSITION TO THE SECOND POSITION│
                   └──────────────────┬───────────────────┘
                                      ▼
                   ┌──────────────────────────────────────┐── 406
                   │  MOVE THE DOOR FROM THE SECOND POSITION│
                   │  TO THE FIRST POSITION AT LEAST PARTIALLY│
                   │  WITHIN THE OPENING OF THE GATEBOX   │
                   └──────────────────┬───────────────────┘
                                      ▼
                   ┌──────────────────────────────────────┐── 407
                   │  FILL THE HOPPER WITH A LIQUID MATERIAL│
                   │  FOR SPREADING THE LIQUID MATERIAL    │
                   │  FROM THE AIRCRAFT                    │
                   └──────────────────┬───────────────────┘
                                      ▼
                   ┌──────────────────────────────────────┐── 408
                   │  DISCHARGE THE LIQUID MATERIAL FROM  │
                   │  THE HOPPER                          │
                   └──────────────────────────────────────┘
```

*FIG. 4*

SLIDING GATEBOX FOR THE RELEASE OF WET AND DRY MATERIAL

TECHNICAL FIELD OF THE INVENTION

This invention relates generally to the field of spreading material from an aircraft, and more specifically to an aircraft gatebox for the release of wet and dry materials with a sliding door.

BACKGROUND OF THE INVENTION

Aircraft are often used to spread material over a surface in a technique referred to as "aerial application." For example, aerial application of materials is commonly used in agricultural, firefighting, forest seeding, and other applications. Aerial application systems may be used to disperse dry material (such as seeds or fertilizer) or wet material (such as water or crop protection products). One type of system that is conventionally used for aerial application is known as a "gatebox." Existing gateboxes generally comprise an opening that allows material to flow out of the gatebox, a hopper portion that stores material and directs the material to the opening, and one or more doors that open and close using hinges in order to regulate the flow of material from the gatebox out of the opening. The gatebox may be controlled to facilitate the release of material at different rates. Gateboxes, however, are generally designed to accommodate the release of either wet or dry material.

SUMMARY OF THE INVENTION

According to embodiments of the present disclosure, disadvantages and problems associated with gatebox systems may be reduced or eliminated.

In an embodiment, a gatebox for an aircraft comprises a hopper configured to contain a solid material or a liquid material in the gatebox, an opening within the hopper configured to allow a solid material in the hopper to be discharged from the gatebox, and a door mechanism with a door that is configured to operate in a first mode to release the solid material from the opening and a second mode to prevent the liquid material from escaping through the opening, wherein the door mechanism is configured to move the door linearly when operating in the first mode.

In another embodiment, a gatebox for an aircraft comprises a hopper configured to contain a material in the gatebox, an opening disposed within the hopper configured to allow the material in the hopper to be discharged from the gatebox, and a door mechanism with a door, the door mechanism configured to shift the door between a first position wherein the door is at least partially within the opening and a second position and slide the door between the second position and a third position, the first position of the door configured to prevent a liquid from escaping through the opening, the second position of the door configured to prevent a solid material from escaping through the opening, and the third position of the door configured to allow the material in the hopper to be discharged.

In yet another embodiment, a method of operating a gatebox affixed to an aircraft comprises shifting a door from a first position at least partially within an opening of the gatebox to a second position configured to prevent a solid material from escaping through the opening, moving the door linearly in a different direction from the second position to a third position, and discharging the solid material through the opening for aerial application of the solid material.

Certain embodiments of the present disclosure may include some, all, or none of the following advantages. For example, certain embodiments provide advantages for enabling a gatebox attached to an aircraft to be used for aerial application of both a liquid or a solid material without the need to change the gatebox attached to the aircraft. As a result of eliminating the need to change the type of gatebox attached to an aircraft an operator can complete a greater range of aerial application tasks more efficiently. Another advantage is that when in use in the liquid mode, the door of the gatebox creates a liquid-proof seal with the opening to avoid liquid products accidentally leaking, such as a herbicide, that have negative ecological and environmental consequences when applied off of the intended target. Yet another advantage is that the gatebox allows for emergency discharge of the payload material in either liquid mode or solid mode to quickly jettison the load in the event of an emergency situation to the aircraft or occupants. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 4 is a flow chart illustrating one embodiment of a method for using a slide door gatebox for the aerial application of a solid material.

DETAILED DESCRIPTION OF THE INVENTION

Figure 1:
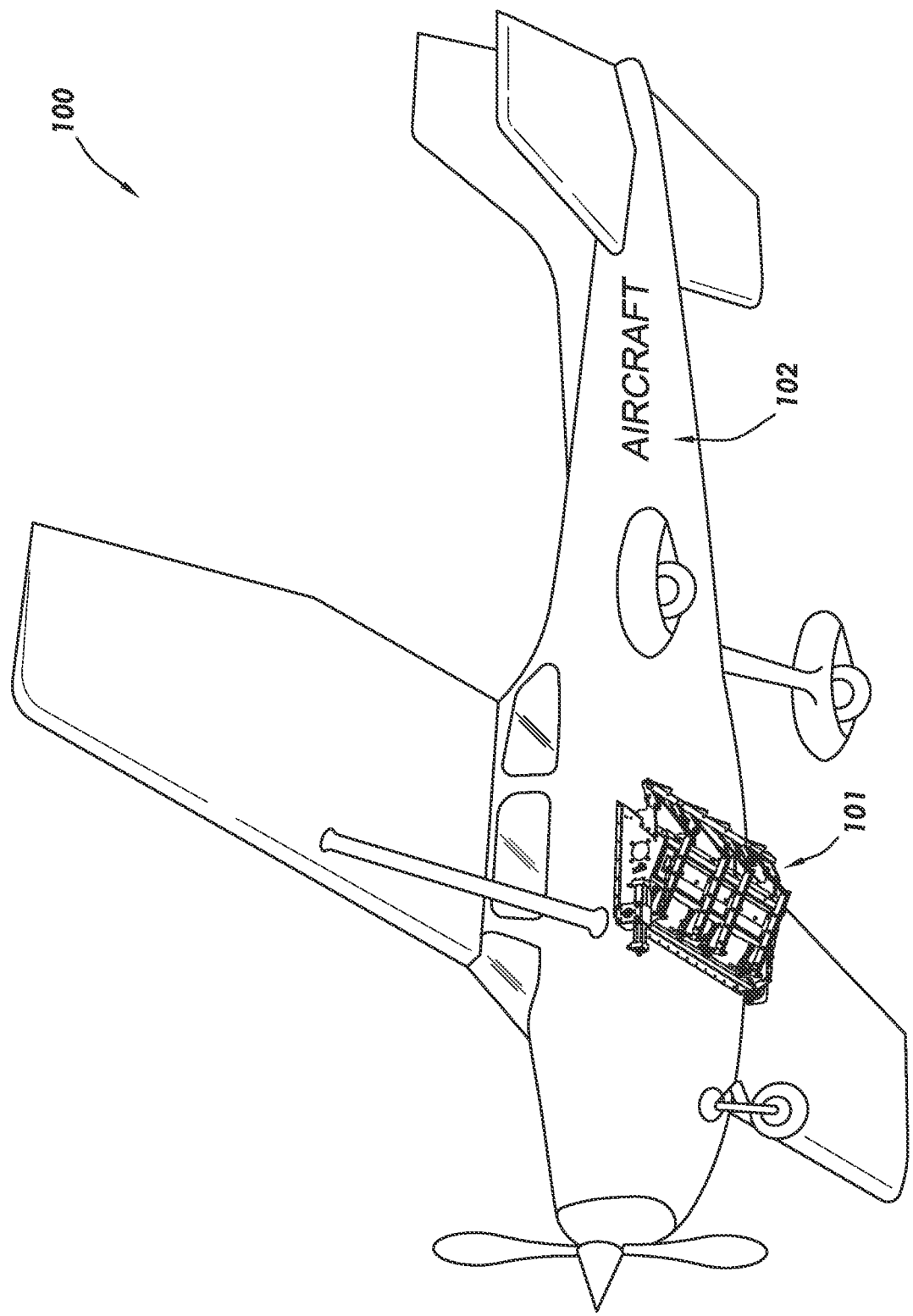
FIG. 1 is an illustration of an embodiment of a gatebox system for spreading material from an aircraft.

Aircraft can effectively facilitate spreading a variety of materials over a surface in industries such as agriculture (e.g., seed, insecticide, fungicide, fertilizer, or herbicide), firefighting (e.g., water or fire suppressant), forestry (e.g., tree planting or regeneration), disease control (e.g., spraying insecticide, fungicide, or other treatment to control disease outbreaks), or any other suitable application that spreads a material over a large surface area. In traditional systems, aircraft release material from a gatebox connected to the aircraft. The gatebox holds the material and controls the flow of material out of the gatebox. In some instances, a spreader will be used in conjunction with the gatebox to better control the distribution pattern of the material being released from the gatebox. A traditional gatebox may include an opening through which material can flow out of the gatebox into a spreader, a hopper that holds material and directs it to the opening, and one or more doors positioned on hinges that control the flow of material out of the opening of the gatebox into a spreader.

In traditional applications, a hinged door opens into a spreader. Yet the path of the door opening results in the obstruction of airflow around the aircraft and the airflow through the spreader. The obstructed airflow around the aircraft creates drag on the aircraft, increases the load on the door and the components of the gatebox that hold the door open, and generates turbulence around the aircraft that interferes with the dispersion pattern of material released from the gatebox. Additionally, the hinged door can restrict airflow through the spreader and interfere with the dispersion pattern of material released from the gatebox. In the event of an emergency jettison of material from the gatebox, the hinged door may restrict airflow through the spreader, thereby limiting the rate at which material can exit the gatebox and reducing the effectiveness of the gatebox to quickly unload the aircraft hopper. Other designs for opening a door of a gatebox include a sliding door to release a solid material but these have traditionally not worked because the sliding door does not have a water-tight seal to accommodate liquid material.

In an embodiment of the present disclosure, a system for spreading either a solid or a liquid material from an aircraft comprises a gatebox with a door that may shift between a sealed position for use with a liquid material and an alternative position for use with a solid material. Embodiments of the present disclosure and its advantages are best understood by referring to FIGS. 1 through 4 of the drawings, like numerals being used for like and corresponding parts of the various drawings. FIG. 1 is an illustration of an embodiment of a gatebox 101 for spreading material from an aircraft 102 while in flight. The system 100 of FIG. 1 may include gatebox 101, aircraft 102, an optional spreader (not illustrated) may also be used in conjunction with the gatebox 101 to better control the distribution pattern of a solid material being released from the gatebox, and an optional boom system (not illustrated) with orifices to spray a liquid material stored in the gatebox 101 that is being released from the aircraft 102. In the preferred embodiment, the gatebox 101 will affix to the underside or belly of the aircraft 102. It is understood that gatebox 101 may be removably affixed or permanently integrated with aircraft 102 and both configurations are contemplated by the present application. Likewise, in FIG. 1 gatebox 101 is illustrated as external to the fuselage of aircraft 102, however, the present application also contemplates embodiments where gatebox 101 is internal to or integrated with the fuselage of aircraft 102. In the illustrated embodiment, aircraft 102 is depicted as an airplane, however, in other embodiments, aircraft 102 may be a helicopter or any other vehicle capable of powered flight. Gatebox 101 is described in more detail below with respect to FIGS. 2-3D.

FIG. 2 illustrates the gatebox 201 that includes a hopper 202 that is integrated into the body of the gatebox 201 as illustrated. Hopper 202 may be filled with either a dry material, such as a seeds or granular fertilizer, or a wet material, such as water or pesticides. Hopper 202 is further configured to contain the payload of either wet or dry material so that when the gatebox 201 is closed the material does not escape, such as during maneuvering of the aircraft 102. Gatebox 201 further includes an opening 203 that permits the dry material to be released from the hopper 202. Hopper 202 may be configured to direct the stored material to the opening 203. In certain embodiments, the opening 203 will be located at the lower end of the gatebox 201 and/or hopper 202 such that the dry material tends to fall out due to gravitational forces pulling the dry material down through the opening 203. It is also appreciated that the opening 203 may be configured or located about the gatebox 201 such that aerodynamic forces further motivate the dry material to be drawn out of the hopper 202 through opening 203. This effect may be further enhanced by one or more aerodynamic devices 230. As illustrated in FIG. 2, aerodynamic device 230 is located at the trailing edge of the door 211 to cause a region of negative pressure relative to the ambient air pressure away from the aircraft while the aircraft is in flight. In certain other embodiments, gatebox 201 may have one or more openings 203. Gatebox 201 further includes a door 211 that, in certain embodiments, controls the flow of the material out of the opening 203. In certain other embodiments, gatebox 201 may have one or more doors 211. As illustrated, door 211 is rectangular in shape but it should be appreciated that door 211 may take a variety of shapes depending on the shape of opening 203.

Gatebox 201 may also include a door seal 212. As illustrated in FIG. 2, door seal 212 is affixed to the door 211, however, door seal 212 may alternatively be affixed to the perimeter of the opening 203. In certain embodiments, one or more door seals 212 are elastomeric compressible seals that are operable to create a liquid (e.g., water)-tight seal. Door seal 212 may be comprised of any suitable material and may create a seal in any suitable fashion. In certain embodiments, the number and configuration of door seals 212 may depend on the number of openings 203 in gatebox 201 and the number of doors 211 in gatebox 201. For example, multiple doors 211 controlling a single opening 203 may have a different number and configuration of door seals 212 than an embodiment with multiple doors 211 controlling multiple openings 203. In an embodiment, door seals 212 may be affixed to doors 211 to generate a seal between neighboring doors 211. Door seals 212 may be operable to engage the sides of door 211 to generate a seal. In an embodiment, door seals 212 engage the edges of door 211 and compress to generate a liquid-tight seal. Door seals 212 may include a lipped edge corresponding to a lipped edge of door 211. In certain other embodiments, the lipped edge of door seals 212 engage a lipped edge of door 211 to create a liquid-tight seal.

Door 211 is supported by, and part of, door mechanism 210. Door mechanism 210 further includes a number of door arms 214 intended to carry the door 211. Between door 211 and door arms 214 are door slides 213. Door slides 213 permit the door 211 to move linearly between a closed position and a fully open position as well as a range of intermediate open positions. The extent to which the door 211 is opened relative to the opening 203 by door slides 213 may be positioned to control the rate at which the solid material is released from the hopper 202. For example, for a given granular solid material, to increase the feed rate, in pounds per minute, the door 211 may be opened further to enlarge the uncovered portion of opening 203. Conversely, for the same granular solid material, to decrease the feed rate, the door 211 may be opened to a lesser degree to restrict the uncovered portion of opening 203. In some embodiments, door slides may include a shaft and collar and/or linear bearing. As will be explained in further detail with respect to FIGS. 3A-3D below, the door 211 may only be permitted to move linearly by door slides 213 when the door mechanism is shifted into the “dry” or “solid” mode of operation.

In certain embodiments, the gatebox 201 may include an interlock device (not illustrated) behind an interlock view port 223 to prevent the actuation of the door 211 by door actuator 216 when the gatebox is in the “wet” or “liquid” mode of operation. Door mechanism 210 further includes a door actuator 216 to move the door 211 linearly between the closed and open positions. Door actuator 216 may be mechanically, electrically, hydraulically, or driven by any other conceivable means of transferring motion. To facilitate moving the door 211, door actuator 216 may be connected to a door actuator shaft 215. Door actuator shaft 215 may be coupled to a door crank arm 217 further coupled to a door linkage 218 connected to the door 211 to translate the rotational motion of the door actuator shaft 215 into the linear travel of the door 211 on door slides 213.

Door mechanism 210 further facilitates shifting the position of the door 211 between a "dry" or "solid" mode and a "wet" or "liquid" mode. In the preferred embodiment, the door mechanism 210 includes a cam and follower type mechanism including mode selector cam 221 that adjusts the door mechanism 210 hinge point to cause the door 211 to shift to a position at least partially within the opening 213 to form a water-tight seal to the interior of the hopper 202. As illustrated, mode selector cam 221 is coupled to a mode selector shaft 220 stabilized by drag bars 219 such that the eccentric motion of the mode selector cam 221 causes the door mechanism 210 to pivot such that the door is moved into or out of the opening 213. Operation of the mode selector cam 221 to shift the position of the door 211 is illustrated and described in further detail with respect to FIGS. 3B and 3C. In certain embodiments, the mode selector shaft 220 may be connected to a mode selector lever 222 at one end to turn the mode selector shaft 220 between the two rotational positions corresponding to the door 211 being shifted between the "dry" or "solid" mode and the "wet" or "liquid" mode. In certain other embodiments, the mode rotation of mode selector shaft 220 may be controllable from the cockpit of the aircraft 102 or may be remotely controllable by other means.

Door mechanism 210 of gatebox 201 further includes a jettison mechanism for the emergency discharge of any payload material, both a liquid or solid material, to quickly jettison the payload in the event of an emergency situation to the aircraft or occupants. For example, the jettison mechanism may be used to drop the weight of the material contained in hopper 202 if the aircraft 102 loses power or flight control. As another example, the jettison mechanism may provide a completely separate mechanical path to open door 211 if jammed to be used to drop the weight of the material contained in hopper 202. The jettison mechanism includes a jettison linkage 241 that supports the bell crank 240. Bell crank 240 is connected to the door mechanism 210 by support rod 242 such that when the shaft of the bell crank 240 rotates the door mechanism pivots away from the body of gatebox 201 and the opening 203. The jettison mechanism is configured to provide the maximum clearance to opening 203. Notably, the jettison mechanism is operable when the gatebox 201 is in either the "dry"/"solid" mode or the "wet"/"liquid" mode and with the door 211 in the closed or any range of open positions. Gatebox 201 may be further connected to a dry material spreader (not illustrated) that disperses the material released through opening 203 by the door 211. Gatebox 201 is intended to be compatible with existing dry material spreaders in the market.

Figure 2:
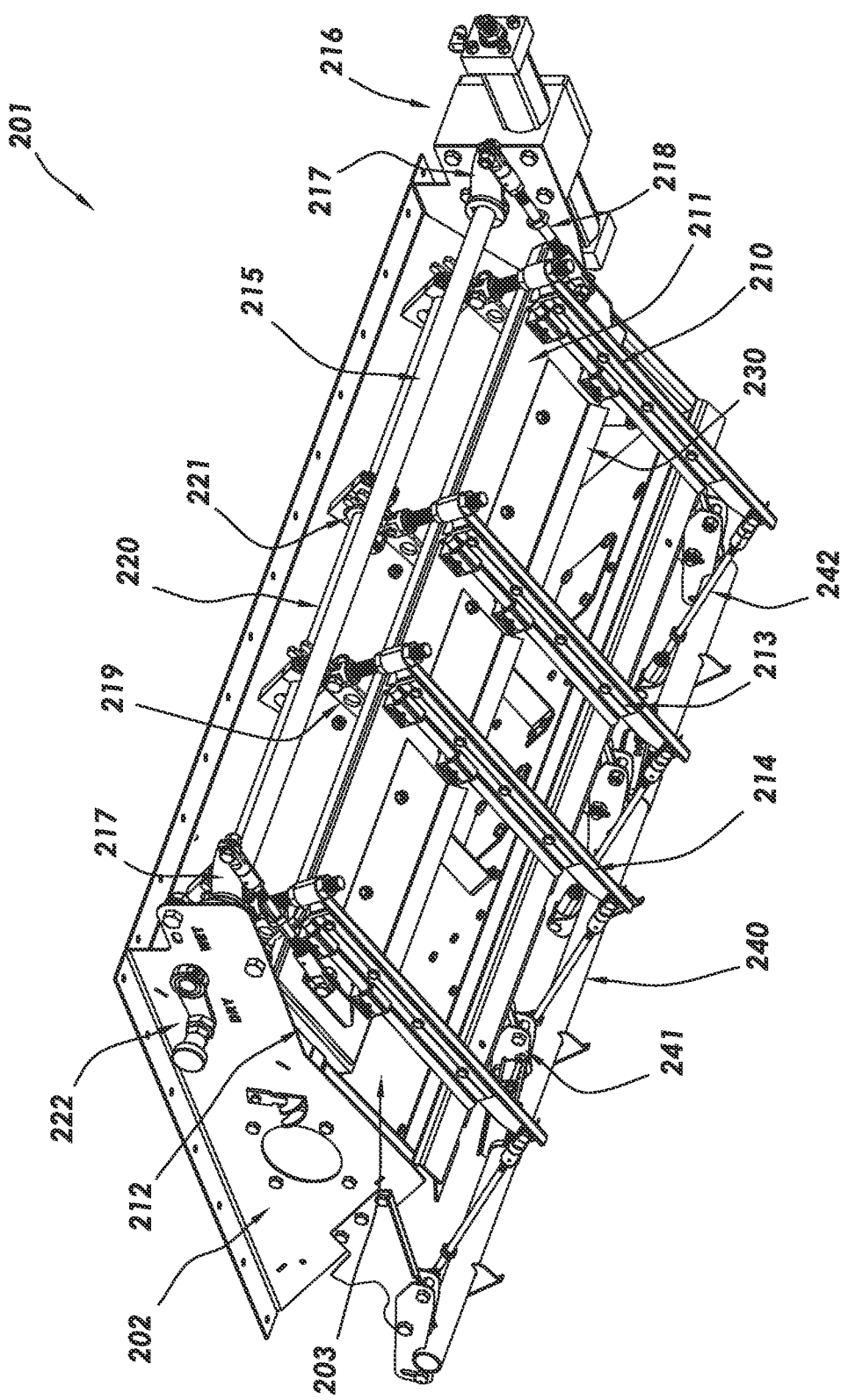
FIG. 2 is an illustration of an embodiment of a sliding door gatebox for use with wet or dry materials.
Figure 3A:
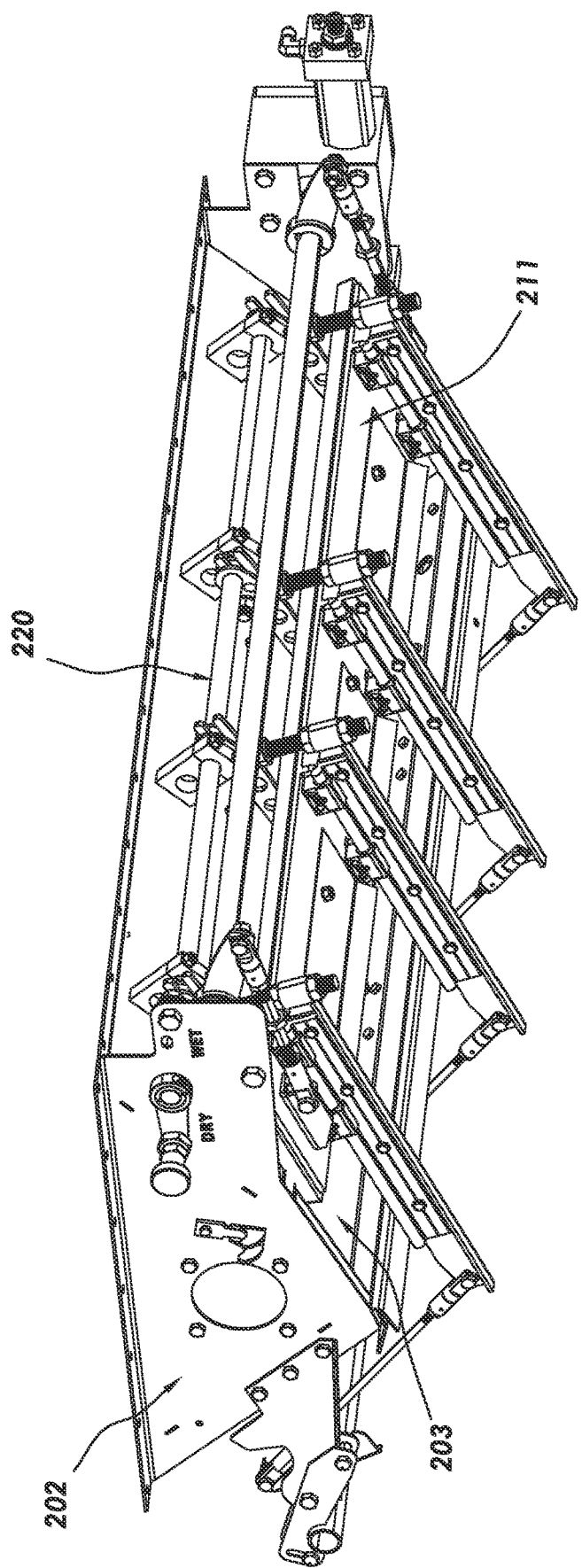
FIGS. 3A-3D illustrate the use of the slide door gatebox in various modes for use with wet or dry materials.

FIGS. 3A-3D illustrate exemplary configurations for the gatebox 201 of FIG. 2. Proceeding in order, FIG. 3A illustrates gatebox 201 in the configuration corresponding to use of the gatebox 201 for application of a "dry" or "solid" material. As further illustrated by FIG. 3A, the door 211 of gatebox 201 is in an open position where the opening 203 is at least partially uncovered to permit a solid material to be discharged through the opening 203. In the position as illustrated in FIG. 3A, the gatebox 201 may be in active use for aerial application of a solid material.

Figure 3B:
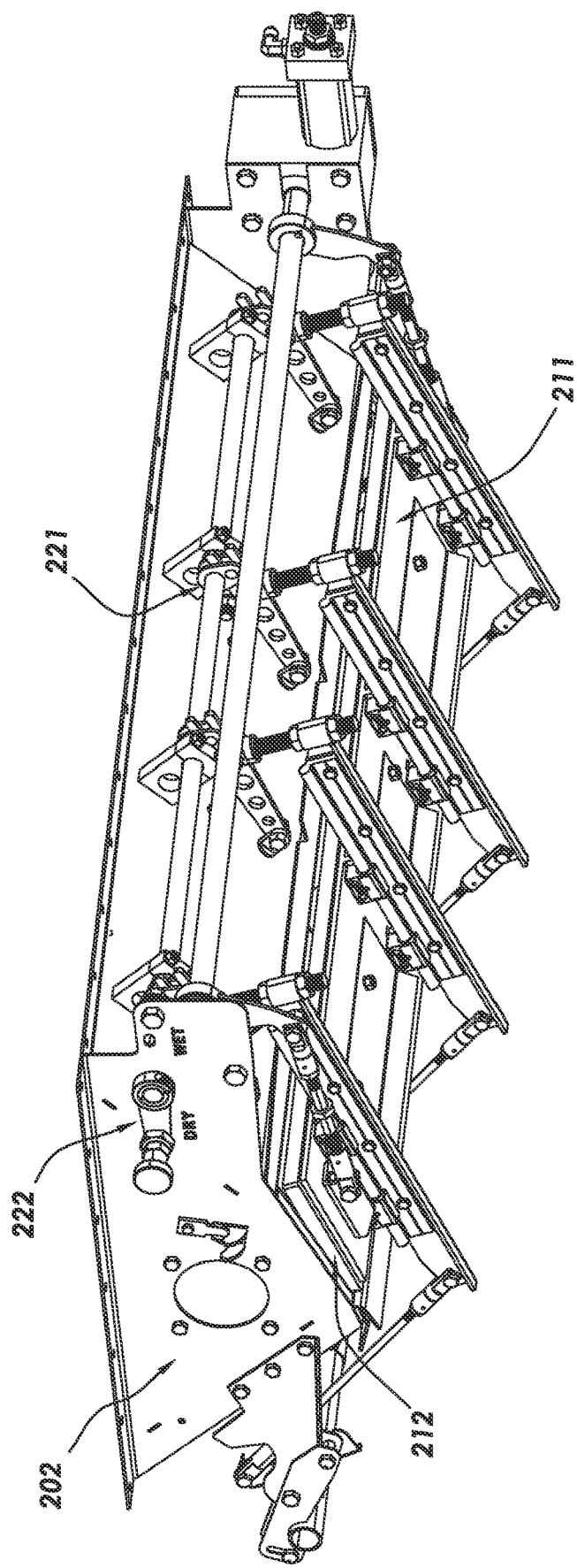

In FIG. 3B, the gatebox 201 is again in the configuration corresponding to use of the gatebox 201 for application of a "dry" or "solid" material. However, as compared to FIG. 3A, the door 211 has moved linearly from an open position to a closed position such that the opening 203 is entirely shut. In the position as illustrated in FIG. 3A, the gatebox 201 is in a position for the hopper to receive the solid material or the aircraft may be in transit to the target location for later discharge of the solid material.

Figure 3C:
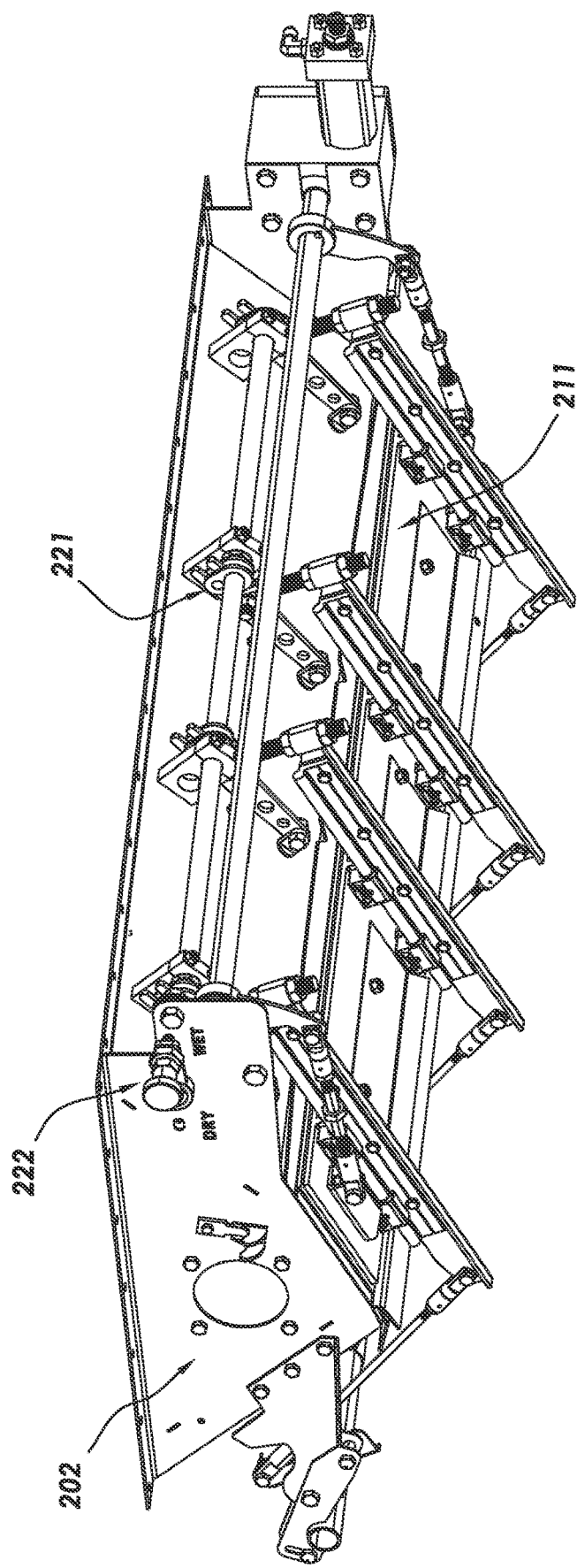

In FIG. 3C, the gatebox 201 is in a configuration for application of a "wet" or "liquid" material. When the gatebox 201 is in the configuration as depicted in FIG. 3C, the hopper 202 of gatebox 201 may be filled with and contain a liquid material without the liquid material leaking through the opening 203 and the door 211. In this "wet" or "liquid" mode, the gatebox may be connected to a spray system (not illustrated) that operates to release the wet material through one or more orifices. The gatebox is intended to be compatible with existing spray systems in the market. When transitioning from the configuration as illustrated in FIG. 3B to the configuration as illustrated in FIG. 3C, the mode selector shaft 220 is rotated, such as by turning mode selector lever 222, to cause the mode selector cam 221 as part of the cam and follower mechanism to pivot the door mechanism 210 such that the door 211 is shifted or pressed into the opening 203. In embodiments where gatebox 201 includes a door seal 212, the door 211 may compress the door seal 212 against the opening 203 to form a water-tight seal to contain any liquid material stored in the hopper 202. As may be appreciated, the foregoing procedures may be performed in reverse to shift the gatebox 201 from the "wet"/"liquid" mode as illustrated in FIG. 3C back to the "dry"/"solid" mode as illustrated in FIG. 3B.

Figure 3D:
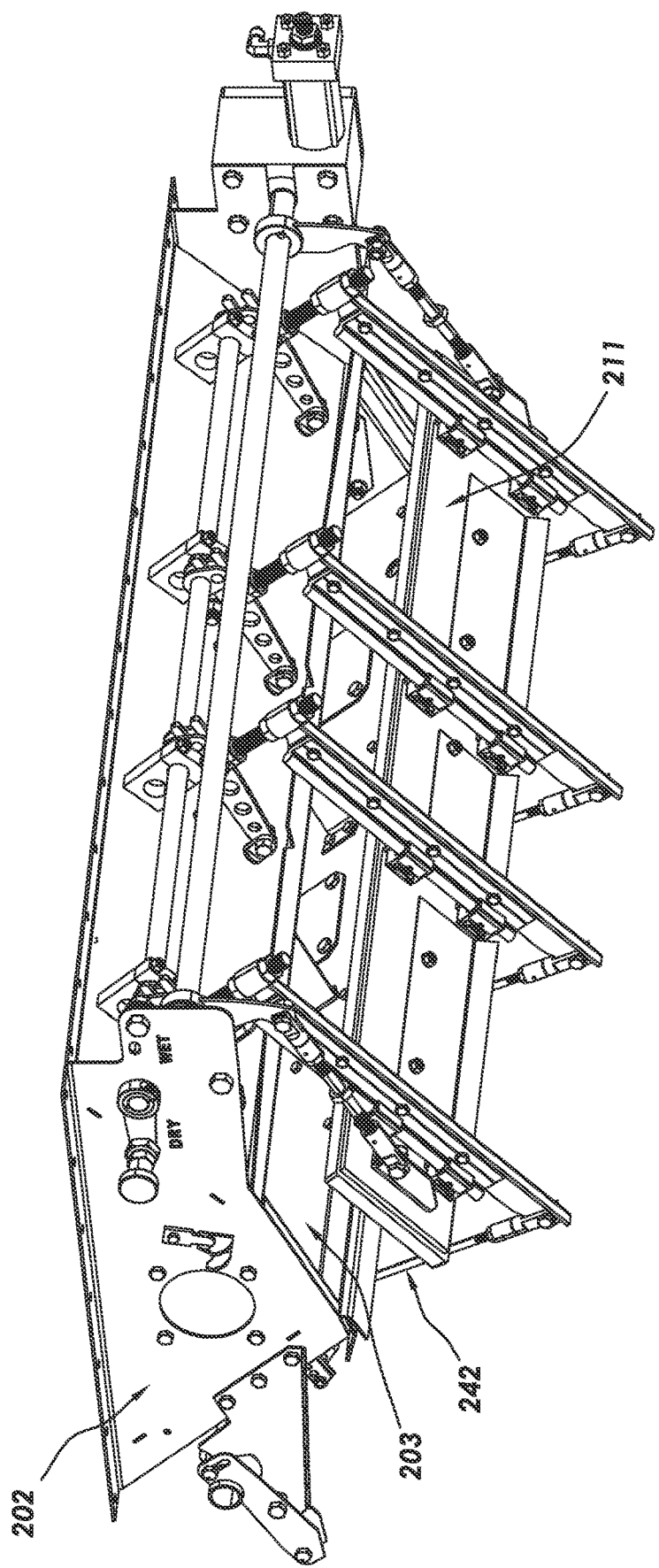

The configuration of gatebox 201 as illustrated in FIG. 3D corresponds to the use of gatebox 201 when in the jettison mode for emergency discharge of the payload material. The gatebox 201 may be changed to the jettison mode from any of the configurations illustrated in FIGS. 3A-3C including any intermediate or transitional configurations. When jettisoning the material contained in hopper 202, the bell crank 240 may be rotated to push the support rod 242 causing the door mechanism to pivot such that the door 211 is moved away and uncovers opening 203.

FIG. 4 is a flowchart illustrating a method 400 of operating a gatebox such as the gatebox 201 illustrated in FIGS. 2-3D. As illustrated in FIG. 4, method 400 may be initiated at step 401. Alternatively, method 400 may be proceeded by some other step, or may be initiated as a later step. In step 401 a hopper of a gatebox is filled with a solid material for spreading of the solid material by an aircraft in flight. Proceeding to step 402, the door of the gatebox is moved from a first position that is at least partially within an opening of the gatebox to a second position. Next, in step 403, the door is moved linearly from the second position to a third position that at least partially uncovers the opening of the gatebox. In some embodiments, method 400 further includes the step of taking flight with the aircraft, for example, the step of taking flight with the aircraft my precede step 403. In step 404 the solid material is discharged through the opening of the gatebox for aerial application. As described previously, in certain embodiments the third position of step 403 may be a position selected to control the flow rate of the material from the hopper through the opening for aerial dispersal. Proceeding next to step 405, the door is moved linearly from the third position back to the second position so that any solid material remaining in the hopper of the gatebox is contained. In step 406 the door is moved from the second position to the first position that is at least partially within the opening of the gatebox to create a liquid-proof seal with the opening. In step 407 the hopper is filled with a liquid material for spreading of the liquid material by an aircraft in flight. Next, in step 408, the liquid material is discharged from the hopper for aerial application. In certain embodiments, the liquid material may be discharged by pumping the liquid material through a spray system mounted to the aircraft.

It should be appreciated that steps 403 through 405 and/or steps 407 through 408 may be repeated multiple times while in flight and/or between flights to apply a material to multiple target locations. In some embodiments, method 400 may be concluded in step 405. In certain other embodiments, method 400 may continue with additional or alternative steps after step 408. The method described with respect to FIG. 4 may have more or fewer steps, and the steps may be performed in any suitable order (e.g., steps 403-404 may be performed as a single step or certain steps may be repeated or eliminated). As another example, in some embodiments, if an emergency condition occurs, method 400 may also include a step of jettisoning the material contained in the hopper by pivoting the door away from the opening and this step may occur between any other step in method 400.

Certain embodiments of the present disclosure may include some, all, or none of the advantages described herein. One or more other technical advantages may be readily apparent to those skilled in the art from the figures, descriptions, and claims included herein. Although the present invention has been described in several embodiments, a myriad of changes, variations, alterations, transformations, and modifications may be suggested to one skilled in the art, and it is intended that the present invention encompass such changes, variations, alterations, transformations, and modifications, as falling within the scope of the appended claims.

What is claimed is:

1. A gatebox for an aircraft, comprising:
a hopper configured to contain a first material or a second material in the gatebox;
an opening disposed within the hopper configured to allow the first material or the second material in the hopper to be discharged from the gatebox, wherein the first material is a liquid material and the second material is a solid material;
a door mechanism comprising a door, a seal, a hinge point, and a door slide;
a mode selector shaft configured to rotate a mode selector cam to move the door mechanism about the hinge point; and
a door crank arm configured to move the door linearly along the door slide;
wherein the door mechanism configured to operate in a first mode and a second mode, the first mode configured to prevent the first material from escaping through the opening by the door being in a first position engaged with the seal and at least partially within the opening, the second mode configured to prevent the second material from escaping through the opening by rotation of the mode selector shaft causing the door being in a second position outside of the opening and at least partially disengaged with the seal, wherein the door mechanism is configured to switch from the first mode to the second mode by pivoting the door from the first position to the second position and further configured to move the door linearly along the door slide by rotation of the door crank arm to release the second material.

2. The gatebox of claim 1, wherein
the mode selector cam is coupled to the mode selector shaft, wherein the mode selector shaft is configured to rotate such that the mode selector cam shifts a position of the door between a position corresponding to the first mode and a position corresponding to the second mode.

3. The gatebox of claim 2, wherein a lever is configured to selectively rotate the mode selector shaft between:
a first angular position where the door is in a first mode position; and
a second angular position where the door is in a second mode position.

4. The gatebox of claim 1, wherein, when operating in the first mode, the door mechanism is further configured to move the door linearly between a closed position and an open position, the open position corresponding to a position of the door relative to the opening selected to control a rate that the first material is discharged from the gatebox.

5. The gatebox of claim 1, wherein the door mechanism further comprises a jettison mechanism, the door mechanism further configured to operate in a third mode and the jettison mechanism pivots the door away from the opening to discharge at least one of the first material and the second material.

6. The gatebox of claim 1, wherein the door comprises an aerodynamic device positioned proximate a trailing edge of the door, the aerodynamic device configured to create a region of low-pressure air around the opening relative to an ambient pressure surrounding the aircraft when the aircraft is in flight.

7. The gatebox of claim 1 further configured to receive at least one of a spreader attachment for use with the first material and a spray system for use with the second material.

8. A gatebox for an aircraft, comprising:
a hopper configured to contain a material in the gatebox;
an opening disposed within the hopper configured to allow the material in the hopper to be discharged from the gatebox; and
a door mechanism comprising a door, a hinge point, a door slide, and a seal; and
a mode selector shaft configured to rotate a mode selector cam to move the door mechanism about the hinge point;
wherein the door mechanism is configured to:
move the door from a first position engaged with the seal and at least partially within the opening to a second position outside of the opening and at least partially disengaged with the seal by rotation of the mode selector shaft causing the door mechanism to pivot about the hinge point; and
move the door between the second position and a third position;
wherein the first position of the door is configured to prevent a liquid from discharging through the opening, and the second position of the door is configured to prevent a solid material from discharging through the opening, and the third position of the door is configured to allow the material in the hopper to be discharged.

9. The gatebox of claim 8, wherein
the mode selector cam is coupled to the mode selector shaft, wherein the mode selector shaft is configured to rotate such that the mode selector cam causes the door mechanism to shift the door between the first position and the second position.

10. The gatebox of claim 9, wherein a lever is configured to selectively rotate the mode selector shaft between:
a first angular position corresponding to where the door is in the first position; and a second angular position corresponding to where the door is in the second position.

11. The gatebox of claim 8, wherein the door mechanism further comprises a jettison mechanism configured to pivot the door to a fourth position away from the opening to discharge the material contained in the hopper.

12. The gatebox of claim 8, wherein the door comprises an aerodynamic device positioned proximate a trailing edge of the door, the aerodynamic device configured to create a region of low-pressure air around the opening relative to an ambient pressure surrounding the aircraft when the aircraft is in flight.

13. The gatebox of claim 8 further configured to receive at least one of a spreader attachment for use with the solid material and a spray system for use with the liquid material.

14. A gatebox for an aircraft, comprising:
   a hopper configured to contain a material in the gatebox;
   an opening disposed within the hopper configured to allow the material in the hopper to be discharged from the gatebox;
   a door mechanism comprising a door, a hinge point, and a door slide;
   a mode selector shaft configured to rotate a mode selector cam; and
   a door actuator shaft configured to rotate a door crank arm that is coupled to the door;
   wherein:
      rotation of the mode selector shaft moves the mode selector cam and thereby moves the door mechanism about the hinge point; and
      rotation of the door actuator shaft rotates the door crank arm and thereby moves the door linearly along the door slide.

15. The gatebox of claim 14, wherein movement of the door mechanism about the hinge point causes the door to be moved either:
   from a position within the opening to a position adjacent to the opening; or
   from the position adjacent to the opening to the position within the opening.

16. The gatebox of claim 15, wherein when the door is in the position within the opening, the door forms a liquid tight seal with the opening.

17. The gatebox of claim 15, wherein when the door is in the position adjacent to the opening:
   the door forms a seal with the opening sufficient to contain solid material; and
   the door may be moved linearly along the door slide to release the material.

18. The gatebox of claim 14, wherein the door mechanism further comprises a jettison mechanism that pivots the door away from the opening to discharge at least one of the first material and the second material.

19. The gatebox of claim 14, wherein the door comprises an aerodynamic device positioned proximate a trailing edge of the door, the aerodynamic device configured to create a region of low-pressure air around the opening relative to an ambient pressure surrounding the aircraft when the aircraft is in flight.

20. The gatebox of claim 14 further configured to receive at least one of a spreader attachment for use with the first material and a spray system for use with the second material.

* * * * *